United States Patent [19]

Helminiak et al.

[11] 4,377,546
[45] Mar. 22, 1983

[54] PROCESS FOR PRODUCING AROMATIC HETEROCYCLIC POLYMER ALLOYS

[75] Inventors: Thaddeus E. Helminiak, Dayton; Charles L. Benner, Fairborn; Fred E. Arnold, Centerville; George Husman, Dayton, all of Ohio

[73] Assignee: The United States of America as represented by the Secretary of the Air Force, Washington, D.C.

[21] Appl. No.: 291,891

[22] Filed: Aug. 11, 1981

[51] Int. Cl.³ .............................................. B29D 7/20
[52] U.S. Cl. ..................................... 264/232; 264/108; 264/234; 264/331.12; 264/331.19; 525/425; 528/183; 528/337; 528/377
[58] Field of Search .............. 264/232, 331.12, 331.19, 264/204, 205, 299, 108, 210.2, 41, 344, 234; 528/183, 337, 377; 525/425

[56] References Cited

U.S. PATENT DOCUMENTS

| | | | |
|---|---|---|---|
| 3,504,072 | 3/1970 | Ploetz et al. | 264/204 |
| 3,699,038 | 10/1972 | Boom | 264/299 |
| 3,903,331 | 9/1975 | Klein | 427/206 |
| 3,930,070 | 12/1975 | Cronenberger et al. | 427/185 |
| 3,932,349 | 1/1976 | Camelon et al. | 260/42.14 |
| 3,962,491 | 6/1976 | Sato et al. | 427/195 |
| 3,980,732 | 9/1976 | Isaksen et al. | 260/850 |
| 4,051,108 | 9/1977 | Helminiak et al. | 528/337 |
| 4,075,369 | 2/1978 | Ferraro et al. | 427/185 |
| 4,108,835 | 8/1978 | Arnold et al. | 528/183 |
| 4,176,143 | 11/1979 | Kraft et al. | 260/835 |
| 4,207,407 | 6/1980 | Helminiak et al. | 525/425 |
| 4,214,071 | 7/1980 | Alvino et al. | 264/205 |
| 4,225,700 | 9/1980 | Wolfe et al. | 528/183 |
| 4,272,467 | 6/1981 | Johnson | 264/331.12 |

Primary Examiner—Jeffery R. Thurlow
Attorney, Agent, or Firm—Donald J. Singer; William J. O'Brien

[57] ABSTRACT

A novel method is taught for preparing polymeric alloys composed of a mixture of an aromatic heterocyclic rod-like reinforcing polymer and an aromatic heterocyclic coil-like amorphous mixture with vastly improved mechanical properties.

3 Claims, No Drawings

PROCESS FOR PRODUCING AROMATIC HETEROCYCLIC POLYMER ALLOYS

STATEMENT OF GOVERNMENT INTEREST

The invention described herein may be manufactured and used by or for the Government for governmental purposes without the payment of any royalty thereon.

BACKGROUND OF THE INVENTION

This invention relates to polymeric alloys composed of rod-like, aromatic, heterocyclic polymers and coil-like, aromatic, heterocyclic polymers. In one aspect it relates to a method for the preparation of composite films at the molecular level that are analogous to chopped fiber composites. In another aspect, it relates to composite films prepared from para ordered, rod-like, aromatic, heterocyclic polymers embedded in an amorphous, heterocyclic system.

Recent developments in the synthesis of rod-like, aromatic, heterocyclic polymers and the molecular composite films produced thereby have generated a continued interest in the development of these polymers as structural materials. As a consequence, a continuing research effort has been undertaken to improve their characteristics and to develop them into more useful product forms, such as fibers, films, or sheets. Basically, the research effort is directed toward the preparation and processing of very high strength, environmentally resistant, polymers for use as structural materials in aerospace vehicles. The objective is the attainment of mechanical properties for a structural material comparable with those currently obtained with fiber reinforced composites, but with significantly higher environmental resistance and without the use of a fiber reinforcement.

The materials found to be most successful for achieving the desired objective of this effort are rigid-rod, extended-chain, aromatic, heterocyclic polymers of the type disclosed in U.S. Pat. Nos. 4,108,835 and 4,207,407. However, these materials presented special processing problems because of the extended-chain, rigid-rod, structural character of their molecules. Previous processing techniques required strong mineral or organic acid solvents and there was little opportunity to influence the polymer morphology once the material was in the solid state.

In accordance with the invention defined in U.S. Pat. No. 4,207,407, however, it was found that this problem could be overcome by a concept which consisted of blending a rod-like, aromatic, heterocyclic polymer with a coil-like, aromatic, heterocyclic polymer. The intent is to reinforce the coil-like or amorphous polymer with the rod-like polymer, thus forming a composite on the molecular level analogous to chopped fiber reinforced composites.

In accordance with that invention, various polymer blends were processed as thin films by vacuum casting from dilute solutions. In general, the procedure followed was to prepare a 1 to 2 percent by weight polymer solution of the polymer blend in methane sulfonic acid and put the solution in a specially fabricated, circular, flat bottomed, casting dish. The dish was then placed and leveled in the bottom of a sublimator. The cold finger of the sublimator was maintained at $-25°$ C. and the sublimator was continuously evacuated and heated to $60°$ C. to facilitate the removal of the methane sulfonic acid. After the films were formed and removed from the casting dish, they were generally dried at $100°$ C. in a vacuum oven for 24 to 48 hours. The films produced were approximately 5-cm in diameter and varied from $1.3 \times 10^{-3}$ to $16.5 \times 10^{-3}$ cm in thickness. Most of the films retained approximately 20 to 30 percent residual solvent.

The high potential utilization of these rod-like polymers as molecular composite films in the fabrication of structural elements for aerospace applications provided the impetus for the continuing research effort referred to above and the attempt to provide even greater improvement in the characteristics of the film composites.

It was found, as a result of this effort, that greater and more efficient dispersion of the rod-like polymer in the amorphous polymer matrix could be achieved by a processing technique involving precipitation instead of the vacuum casting, film forming technique disclosed in U.S. Pat. No. 4,207,407. As a result, the mechanical properties of the molecular composite films of this invention are considerably improved when compared to those exhibited by the vacuum cast films previously fabricated, thus indicating excellent translation of rod properties.

SUMMARY OF THE INVENTION

Broadly, the present invention involves an improved process for preparing polymer alloys composed of a mixture of a flexible, coil-like, heterocyclic polymer which acts as an amorphous matrix and a reinforcing amount of a rod-like aromatic, heterocyclic polymer embedded within the amorphous matrix.

The improved process involves the technique of precipitating the composite film from a dilute solvent solution containing a mixture of the coil-like amorphous polymer and the rod-like polymer in a high humidity environment. As a result, it was found that the rod-like polymers functioned more effectively because of their more widespread dispersion, thus providing greater reinforcement for the coil-like polymer mixture and resulting improvement in modulus and tensile strength characteristics of the film composite.

The primary object of this invention, therefore, is to provide an improved process for the production of polymeric alloys composed of a coil-like, amorphous, heterocyclic, polymeric matrix and a rod-like, heterocyclic polymer embedded therein.

A further object of this invention is to provide an improved molecular composite film that is analogous to a chopped fiber composite.

Still a further object of this invention is to provide aromatic, heterocyclic alloys that find special utility as structural materials capable of operating effectively within the high temperature environment encountered by high performance aircraft and re-entry vehicles.

The above and still further objects and advantages of the present invention will become more readily apparent upon consideration of the following detailed description thereof.

DESCRIPTION OF THE PREFERRED EMBODIMENT

It has been discovered that stiff chain, rod-like polymers can function as a reinforcement in a coil-like polymer matrix. As a result, a composite film at the molecular level can be readily fabricated that is analogous to a chopped fiber composite. As intimated above, the role of rod-like polymer molecules, individually and in aggregate, is to reinforce the softer, more flexible, matrix material, thereby improving the modulus and tensile strength of the composite mixture. Furthermore, the composite mixture can be induced to exhibit anisotropic mechanical properties by causing flow of the polymer mixture. Extensional flow causes the individual and aggregate stiff chain, rod-like, polymer molecules to orient in the direction of flow, and, as a consequence of the orientation, the mechanical properties are vastly improved.

The present invention, therefore, relates to an improved process for producing molecular film composites possessing vastly improved mechanical properties over those exhibited by previously fabricated polymeric film composites. Thus, a composite film at the molecular level, that is analogous to chopped fiber composite, is produced.

The role of the rod-like, polymer molecules, individually and in aggregate, is to reinforce the softer, more flexible, matrix material, thus improving the modulus and tensile strength of the composite mixture. The molecular mixtures can be induced to exhibit anistropic mechanical properties by causing flow of the polymer mixture.

Consequently, in one embodiment, the invention lies in a composite film comprising a coil-like, heterocyclic, polymeric matrix and a reinforcing amount of a rod-like, aromatic, heterocyclic polymer embedded therein. The film generally contains about 5 to 50 weight percent, preferably 10 to 30 weight percent, of the rod-like polymer. In a more specific embodiment, the invention resides in an improved method for fabricating a molecular composite film.

Initially, a two percent solution, containing a mixture of about 10 weight percent of the rod-like, heterocyclic polymer and the balance being the coil-like heterocyclic polymer, were prepared in methanesulfonic acid (MSA). Generally, the amount of polymer dissolved in the acid solvent can be from about one to 30 percent by weight, preferably one to 5 percent by weight. Ten milliliters of the two percent solution were pipetted into a flat bottom, film casting dish. The dish was placed on a level platform in an enclosed chamber containing water in the bottom. The solution was allowed to absorb water vapor from the air in the chamber until a precipitated film had formed. The casting dish was removed, the water acid mixture was decanted, and the resulting film was carefully rinsed with running water. The film was pressed to 1200±200 PSI in a hydraulic press and dried under tension after being further washed with water and methanol. After drying, the film was neutralized with dilute ammonium hydroxide, washed with methanol and dried at 100° C. overnight in a vacuum oven. The step of drying the film under tension, although desirable, is not necessary to the invention.

In order to optimize the strength properties of the composite mixture, it is often preferred to subject the stiff chain, rod-like reinforcement in the soft, flexible polymer matrix to uniaxial orientation. This uniaxial orientation of the film is accomplished by initially allowing residual casting solvent, which acts as a plasticizer, to remain in the polymer mixture constituting the film. The film is then stretched or elongated to provide the desired orientation. Elongation of the film can be carried out by well known procedures. In one procedure, elongation for uniaxial orientation is conveniently conducted with an Instron tensile tester at crosshead speeds of about 0.01 to 0.5 inch per minute, preferably at slower rates of 0.01 to 0.02 inch per minute. During orientation, the film is elongated or stretched by about 5 to 40 percent of its original length. The concentration of residual solvent (plasticizer) in the composite mixture ranges from about 1 to 30 weight percent, preferably about 15 weight percent.

After orientation of the stiff chain rods in the uniaxial direction of the composite mixture, residual solvent is leached from the film by means of the precipitation techniques of this invention. Examples of non-solvents for the polymers that can be used include aliphatic alcohols and ketones, such as methanol, ethanol, propanol, isopropanol, acetone, methylethylketone, and the like. Removal of the solvent by leaching is generally completed in about 5 to 30 minutes after which the film is recovered and dried to remove any non-solvent.

Even further enhancement of the physical properties of the composite film can be obtained if the leaching of the solvent is conducted while the film is under tension. Thus, the non-solvent is advantageously applied to the surface of the film while under tension during the uniaxial orientation procedure.

In the foregoing discussion, the invention has been described primarily as it relates to composite films. However, the polymeric alloys of this invention are not limited to use in the fabrication of film composites. For example, mixtures of the rod-like, aromatic, heterocyclic polymer and the coil-like, heterocyclic, aromatic polymer dissolved in methanesulfonic acid can be used as a spinning dope. The as-spun fibers can be elongated, by well known methods, to produce high strength, high modulus, thermally stable fibers.

The rod-like aromatic heterocyclic polymers used in the practice of the present invention exhibit 'para' ordered geometry. Examples of such polymers, which are described in the literature, include those consisting essentially of repeating units having the following formulas:

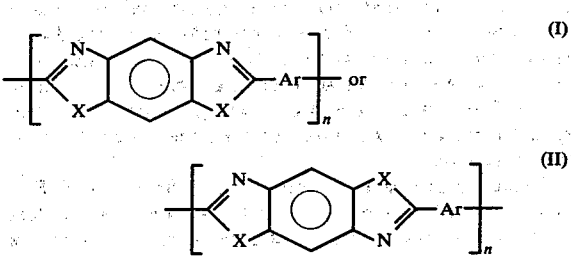

wherein X is NH, N$\phi$, O or S, where $\phi$ is phenyl, and wherein Ar is

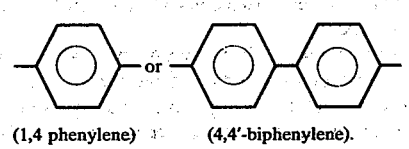

(1,4 phenylene)    (4,4'-biphenylene).

In the foregoing formulas, n is an integer equal to the number of recurring units and has a value such that the polymers have an intrinsic viscosity of at least 2 dl/g, preferably 5 to 30, inclusive, as determined in methanesulfonic acid at 30° C. Examples of other rod-like polymers that can be used include those disclosed in U.S. Pat. No. 4,108,835.

Flexible, coil-like, heterocyclic polymers used in combination with the rod-like polymers are also described in the literature. Examples of such polymers include those consisting essentially of repeating units having the following formulas:

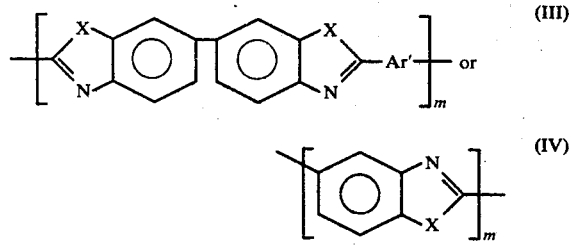

wherein X is NH, Nφ, O or S, where φ is phenyl and Ar' is

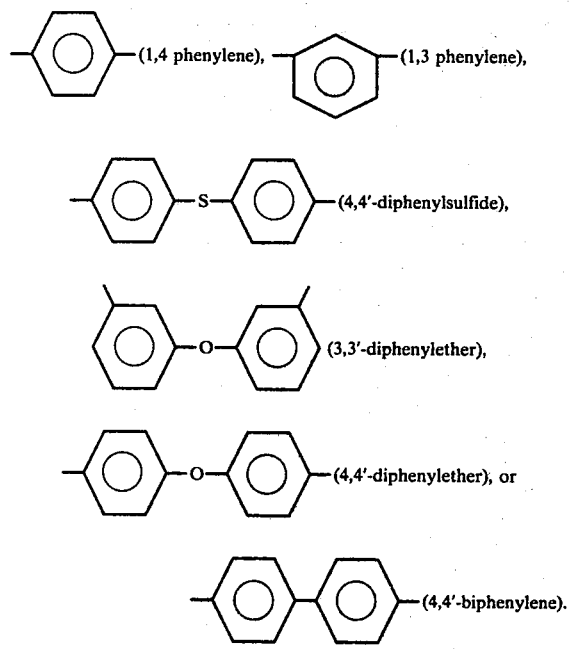

In the above formulas, m is an integer equal to the number of recurring units and has a value such that the polymers have an intrinsic viscosity of at least 1 dl/g, preferably 2 to 20, inclusive, as determined in methanesulfonic acid at 30° C.

Specific examples showing the structural formulas of the particular rod-like and coil-like polymers contemplated by formulas I, II, III and IV are shown as follows in Table I.

TABLE I

| CHEMICAL STRUCTURE | ACRONYM |
|---|---|
| Rod-Like Polymers | |
| 1. 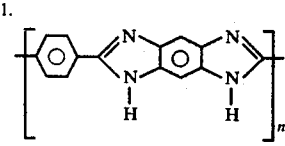 | PDIAB |

TABLE I-continued

| CHEMICAL STRUCTURE | ACRONYM |
|---|---|
| 2. 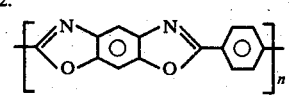 | PBO |
| 3. 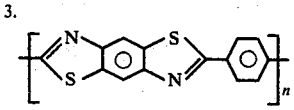 | PBI |
| Coil-Like Polymers | |
| 1. 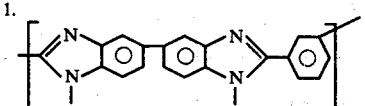 | M-PBI |
| 2. 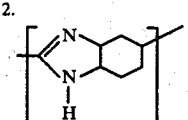 | AB-PBI |
| 3. 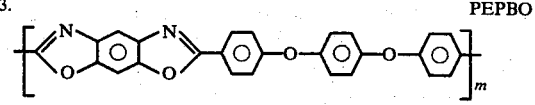 | PEPBO |
| 4. 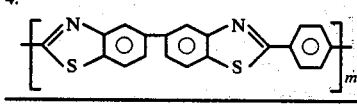 | PPBI |

The particular blends of the rod-like and coil-like polymers contemplated by the invention are shown in Table II, while Table III discloses the improved mechanical properties of a 90 percent AB-PBI-10 percent PDIAB polymeric film composite prepared in accordance with the precipitation method of this invention.

TABLE II

| | POLYMER BLENDS | | |
|---|---|---|---|
| | Matrix | Reinforcement | Weight Percents of Reinforcements |
| 1. | M-PBI | PDIAB | 0, 20, 50, 75 |
| 2. | AB-PBI | PDIAB | 0, 10, 20, 30, 57, 75 |
| 3. | PPBT | PBT | 0, 25, 50, 75 |
| 4. | PEPBO | PBO | 0, 25, 50, 60, 75 |
| 5. | AB-PBI | PBO | 0, 10, 20, 30 |

TABLE III

| MECHANICAL PROPERTIES - 90% AB-PBI/10% PDIAB | | | |
|---|---|---|---|
| Strength | | (Precipitated) | |
| % Area Reduction | Modulus (G Pa) | Strength (M Pa) | Strain (%) |
| None | 3.08 | 92.39 | 15 |
| Mech./5 | 4.00 | 122.09 | 13 |
| Solvent/55 | 9.65 | 243.95 | 3 |

A comparison of the properties of a film prepared by the precipitation method of this invention and the properties of a film prepared by the vacuum cast procedure of the prior art is shown in Table IV. For comparison purposes, this table also discloses the properties of a cast film prepared from the coil-like polymer only without the benefit of the reinforcing rod-like polymer.

TABLE IV

| Rod (wt. %) | Coil (wt. %) | Preparation Method | Tensile (M Pa) | Modulus (G Pa) |
|---|---|---|---|---|
| | AB-PBI (100) | As Cast | 80 MPa | 1.03 GPa |
| | | As cast w/ stretch | | 3.37 GPa |
| PDIAB (10) | AB-PBI (90) | As Cast | 70 MPa | 2.00 GPa |
| | | As Cast w/ stretch | | 6.86 GPa |
| PDIAB (10) | AB-PBI (90) | As ppt. | 92.4 MPa | 3.08 CPa |
| | | As ppt. w/ stretch | | 9.65 GPa |
| Present improvement comparing Casting to precipitation Method. | | | 32% | 54% 41% |

As can be seen from the data in Tables, III and IV, the present invention provides a novel method for producing high strength reinforced composites based on the formation of polymer alloys with mechanical properties vastly improved over those exhibited by polymer alloys prepared heretofore by the well known vacuum casting technique.

With the foregoing description in mind, it should be remembered that the present disclosure is presented by way of illustration only, and that all such modifications and alterations as are encompassed within the appended claims are intended to be included herein.

What is claimed is:

1. A method for preparing a molecular composite film comprising the steps of:
A. forming a solvent mixture composed of (1) about 70 to 99 weight percent of methanesulfonic acid and (2) about one to 30 weight percent of a polymer mixture composed of (a) about 5 to 50 percent of a rod-like, aromatic, heterocyclic polymer and (b) about 50 to 95 weight percent of an amorphous, coil-like, aromatic, heterocyclic polymer; said rod-like, heterocyclic polymer consisting essentially of repeating units having the following structural formula:

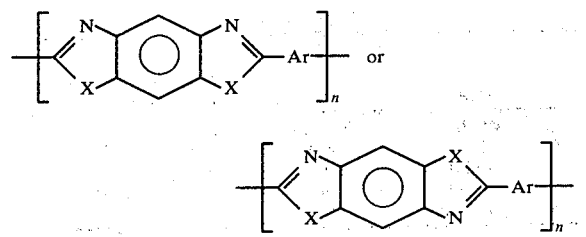

Wherein X is NH, Nφ, O or S, where φ is phenyl, and Ar is

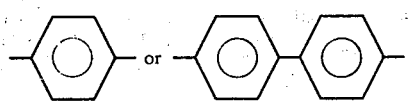

and n is an interger having a value such that the polymer has an intrinsic viscosity of about 5 to 30 dl/g as determined in methanesulfonic acid at 30° C.; and said coil-like, heterocyclic polymer consisting essentially of repeating units having the following structural formula:

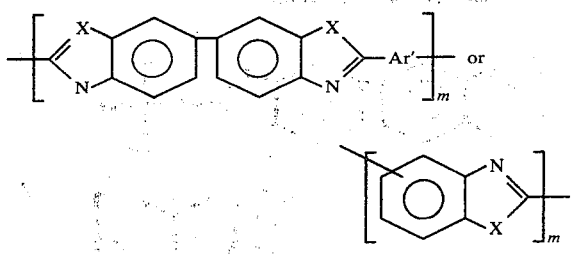

Wherein x is NH, Nφ, O or S, where φ is phenyl and Ar' is

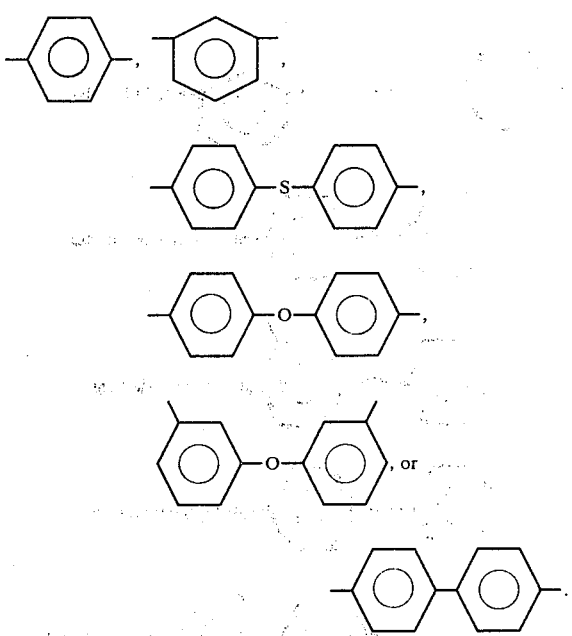

and m is an integer having a value such that the polymer has an intrinsic viscosity of about 2 to 20 dl/g as determined in methanesulfonic acid at 30° C.;
B. introducing said solvent mixture into a casting mold positioned within an enclosed chamber containing water vapor;
C. permitting said solvent mixture to absorb said water vapor for a period of time sufficient to form a precipitated film;
D. recovering said precipitated film from said mold; and
E. drying the recovered film.

2. A method in accordance with claim 1 wherein said rod-like polymer consists essentially of repeating units having the following structural formula:

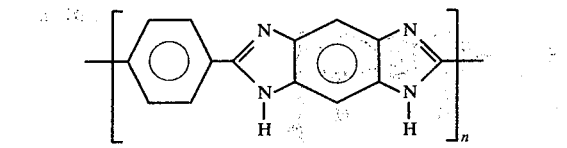

3. A method in accordance with claim 1 wherein said coil-like polymer consists essentially of repeating units having the following structural formula:
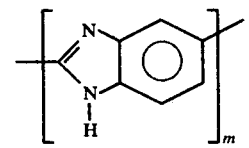
* * * * *